(12) United States Patent
Lewis

(10) Patent No.: US 10,474,655 B1
(45) Date of Patent: Nov. 12, 2019

(54) ENTITY DATABASE

(71) Applicant: Improbable Worlds Ltd, London (GB)

(72) Inventor: Matthew John Reveley Lewis, London (GB)

(73) Assignee: Improbable Worlds Ltd, London (GB)

( * ) Notice: Subject to any disclaimer, the term of this patent is extended or adjusted under 35 U.S.C. 154(b) by 0 days.

(21) Appl. No.: 16/042,068

(22) Filed: Jul. 23, 2018

(51) Int. Cl.
| | | |
|---|---|---|
| *G06F 16/22* | (2019.01) | |
| *G06F 16/23* | (2019.01) | |
| *G06F 16/245* | (2019.01) | |
| *G06F 16/00* | (2019.01) | |

(52) U.S. Cl.
CPC .......... *G06F 16/2264* (2019.01); *G06F 16/22* (2019.01); *G06F 16/2246* (2019.01); *G06F 16/2379* (2019.01); *G06F 16/245* (2019.01); *G06F 16/00* (2019.01)

(58) Field of Classification Search
CPC ......... G06F 17/30867; G06F 17/30873; G06F 3/011; G06F 16/22; G06F 16/00; G06F 16/2264; G06F 16/2379; G06F 16/245; G06T 17/00; A63F 13/79; A63F 2300/5533; H04L 67/26; H04L 65/1066
USPC ..... 707/E17.014, 769, 999.005, E17.11, 743
See application file for complete search history.

(56) References Cited

U.S. PATENT DOCUMENTS

| | | | | |
|---|---|---|---|---|
| 6,633,867 B1 * | 10/2003 | Kraft | .................. | G06Q 30/0601 705/26.1 |
| 8,001,152 B1 * | 8/2011 | Solan | .................. | G06F 17/2785 707/791 |
| 10,080,044 B2 * | 9/2018 | Sharif-Ahmadi | ....... | H04L 41/12 |
| 10,146,877 B1 * | 12/2018 | Zolnieryk | ............. | G06F 3/0487 |
| 2001/0013030 A1 * | 8/2001 | Colby | ............... | G06F 17/30312 |
| 2008/0201321 A1 * | 8/2008 | Fitzpatrick | ........ | G06F 17/30867 |
| 2008/0263460 A1 * | 10/2008 | Altberg | .................. | G06Q 30/02 715/757 |
| 2009/0063453 A1 * | 3/2009 | Adler | ................ | G06F 17/30241 |

(Continued)

OTHER PUBLICATIONS

"Apache Cassandra," The Apache Software Foundation, Accessed Jul. 23, 2018, http://cassandra.apache.org/.

(Continued)

*Primary Examiner* — Dennis Truong
(74) *Attorney, Agent, or Firm* — Banner & Witcoff, Ltd.

(57) ABSTRACT

Database schemas, systems, and methods are described herein which enhance database operations when responding to streaming (subscribed) queries regarding records stored in the database. A database schema may include a data table storing a plurality of records each having a plurality of data fields. The schema may also include a query table, and a query index table or tree, or other data structure. The data table stores the current state of each record as defined by its associated data fields. The query table stores all queries mapped to the one or more clients that have subscribed to each query. The query index table, tree, or other data structure indexes the subscribed queries based on a data field common to or associated with the indexed queries. Subsequently, when records and data fields are updated (mutated) in the database, the query index data structure can be used to quickly assess which subscribed clients need to be sent updates with mutated data, so that only the clients who have subscribed to receive updates based on a particular data field do so and the cost of identifying those clients is greatly reduced.

15 Claims, 8 Drawing Sheets

(56) References Cited

U.S. PATENT DOCUMENTS

| | | | | |
|---|---|---|---|---|
| 2010/0169799 | A1* | 7/2010 | Hyndman | A63F 13/12 |
| | | | | 715/757 |
| 2010/0333031 | A1* | 12/2010 | Castelli | G06F 17/30861 |
| | | | | 715/835 |
| 2011/0196913 | A1* | 8/2011 | Acharya | H04L 67/24 |
| | | | | 709/203 |
| 2011/0302194 | A1* | 12/2011 | Gonzalez | G06F 17/30241 |
| | | | | 707/769 |
| 2012/0050257 | A1* | 3/2012 | Clarke | G06F 16/972 |
| | | | | 345/419 |
| 2012/0054217 | A1* | 3/2012 | Clarke | G06F 17/30873 |
| | | | | 707/769 |
| 2013/0066880 | A1* | 3/2013 | Schramm | G01C 21/32 |
| | | | | 707/743 |
| 2013/0138646 | A1* | 5/2013 | Sirer | G06F 17/30545 |
| | | | | 707/736 |
| 2013/0238706 | A1* | 9/2013 | Desai | H04L 67/306 |
| | | | | 709/204 |
| 2014/0214890 | A1* | 7/2014 | Johnson | G06F 17/30584 |
| | | | | 707/770 |
| 2016/0350392 | A1* | 12/2016 | Rice | G06F 17/30339 |
| 2017/0168802 | A1* | 6/2017 | Quinlan | G06F 16/43 |
| 2018/0108110 | A1* | 4/2018 | Cuervo | G06T 1/60 |

OTHER PUBLICATIONS

"Scylla—The Real-Time Big Data Database," Accessed Jul. 23, 2018, https://www.scylladb.com/.
"MySQL," Oracle Corporation, Accessed Jul. 23, 2018, https://www.mysql.com/.
"RethinkDB," Accessed Jul. 23, 2018, https://www.rethinkdb.com/.
"MongoDB for Giant Ideas," Accessed Jul. 23, 2018, https://www.mongodb.com/.
"Redis," RedisLabs, Accessed Jul. 23, 2018, https://redis.io/.
"Hazelcast IMDG," Accessed Jul. 23, 2018, https://hazelcastorg/.
"PostGIS—Spatial and Geographic Objects for PostgreSQL," Accessed Jul. 23, 2018, https://postgis.net/.
"Amazon DynamoDB," Accessed Jul. 23, 2018, https://aws.amazon.com/dynamodb/.
"Cloud Bigtable—A High Performance NoSQL database Service for Large Analytical and Operational Workloads," Accessed Jul. 23, 2018, https://cloud.google.com/bigtable/.

* cited by examiner

```
def create(entityId, initialState) {
  entityTable.add(entityId, initialState)
  dataIndex.add(entityId, initialState)

publishEvent({}, CREATE, {entityId: initialState})
} def update(entityId, componentUpdate) {
  oldState = entityTable.get(entityId)
  newState = applyUpdate(oldState, componentUpdate)
  entityTable.add(entityId, newState)
  dataIndex.add(entityId, newState)

publishEvent({entityId: oldState}, UPDATE, {entityId: newState})
} def delete(entityId) {
  oldState = entityTable.get(entityId)
  entityTable.remove(entityId)
  dataIndex.remove(entityId)

publishEvent({entityId: oldState}, DELETE, {})
}
```

FIG. 7

```
def query(fmlQuery) {
  if (isSpatialQuery(fmlQuery)) {
    matches = dataIndex.search(fmlQuery)
  } else {
    matches = { e for e in entityTable such that fmlQuery.constraintMatches(e) }
  } return fmlQuery.summaryFunction(matches)
} def subscribe(subscriptionId, fmlQuery) {
  channel = new Channel()
  queryTable.add(subscriptionId, fmlQuery, channel)

if (isSpatialQuery(fmlQuery)) {
    queryIndex.add(boundingBox(fmlQuery), subscriptionId, fmlQuery, channel)
  } else {
    unindexedQueries.add(subscriptionId, fmlQuery, channel)
  } sendInitialView(channel, query(fmlQuery))
} def unsubscribe(subscriptionId) {
  channel = queryTable.get(subscriptionId)
  channel.close()
  queryTable.remove(subscriptionId)
  queryIndex.remove(subscriptionId)
  unindexedQueries.remove(subscriptionId)
} def publishEvent(preState, mutation, postState) {
  matches = queryIndex.search(preState) + queryIndex.search(postState) + unindexedQueries for (query, channel) in matches
      such that query.constraintMatches(preState) or query.constraintMatches(postState) {
    switch (query.resultType) {
    case Count:
      countDelta = query.countMatches(preState) - query.countMatches(postState)
      channel.send(CountDelta(countDelta))
    case Snapshot(componentList):
      if (query.constraintMatches(preState) && !query.constraintMatches(postState)) {
        channel.send(EntityDeleted(preState.id))
      } else {
        oldView = restrictStateToComponents(preState, componentList)
        newView = restrictStateToComponents(postState, componentList)

if (newView != oldView) {
          channel.send(EntityUpdated(postState.entityId, postState))
        }
      }
    }
  }
}
```

FIG. 8

ENTITY DATABASE

FIELD

Aspects described herein generally relate to computer software and databases in particular. More specifically, aspects described herein relate to databases having ancillary data structures to facilitate efficient tracking and execution of multidimensional query subscriptions across multiple clients.

BACKGROUND

In games, simulations, and other software utilizing a simulated spatial environment, the actions of one entity may affect the behavior and appearance of other entities in the simulated spatial environment. For instance, if one entity explodes, all other entities within a reasonable range might need to be updated so each can react appropriately to the explosion. These updates can happen concurrently across multiple threads within the same or multiple processes, which means that as the number of updates increases, so may also the latency. Additionally, each time behavior occurs within a region that can affect its entities, a client, game engine, database, or other entity administrator must determine which entities are affected in order to perform the updates. This is an expensive operation to perform each time an update to any entity may be necessary, and as simulation scale increases, the number of updates increases quadratically. Existing database technologies are unable to sustain necessary persistence, normal and spatial query capabilities, streaming queries, scalability, throughput, and consistency for large scale simulations. Improvements to database technology are needed.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods for efficiently determining which entities stored in a database are affected by the mutations (e.g., create, update, or delete) of other entities and, subsequently, updating the affected entities automatically or responsive to an ongoing (subscribed) query. In one or more embodiments, a database comprises three data structures: an entity data structure, a query data structure, and query index data structure. The entity data structure may store the current state of each entity, along with a corresponding unique ID. The query data structure may store all queries subscribed to by clients, along with a corresponding unique ID and the subscribing client's ID. The query index data structure may index entities based on a component associated with each or many queries to efficiently calculate which queries are affected by each mutation to the entity table. For example, the query index data structure may store a region of space associated with each query to allow for faster identification of spatial queries that are associated with entities within a predefined spatial range of a mutation. In some embodiments, the database may comprise additional index data structures to improve query efficiency. For example, an entity position index data structure may optionally be used to store the current position of each entity to allow for faster execution of spatial queries.

In some embodiments, clients may subscribe to one or more spatial queries (e.g., a query based on a region or set of defined interests in a simulated 3D environment). When a client subscribes to a query, the query, its unique ID, and the client's ID are added to the query data structure. Additionally, the query's unique ID and a region of space for which the query is relevant are added to the query index data structure. A persistent connection may be established between the client and the device on which the database is stored. In some embodiments, a client library proxy maintains the connection with the database and coordinates one or more clients' subscriptions. For the duration of the connection, whenever an entity is mutated, and the mutation impacts the region of space or the set of defined interests within which the client has subscribed to a query, the query is executed, and, for each entity encompassed within the query, an entity update is sent to the client for which the query pertains.

In some embodiments, the database is divided into shards based on entity ID. A client library proxy may intercept data that is sent between the clients and the database shards to determine the appropriate recipient. When a single client executes a query operation that results in a plurality of responses from one or more shards, the client library may demultiplex the plurality of responses to form a single response. Each client may thus remain unaware that the database is sharded. The client library may then send the single response to the client, thereby avoiding unnecessary communication between the database shards and the clients.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 7 illustrates pseudocode for create, update, and delete operations according to an illustrative embodiment.

FIG. 8 shows pseudocode for some operations according to an illustrative embodiment.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
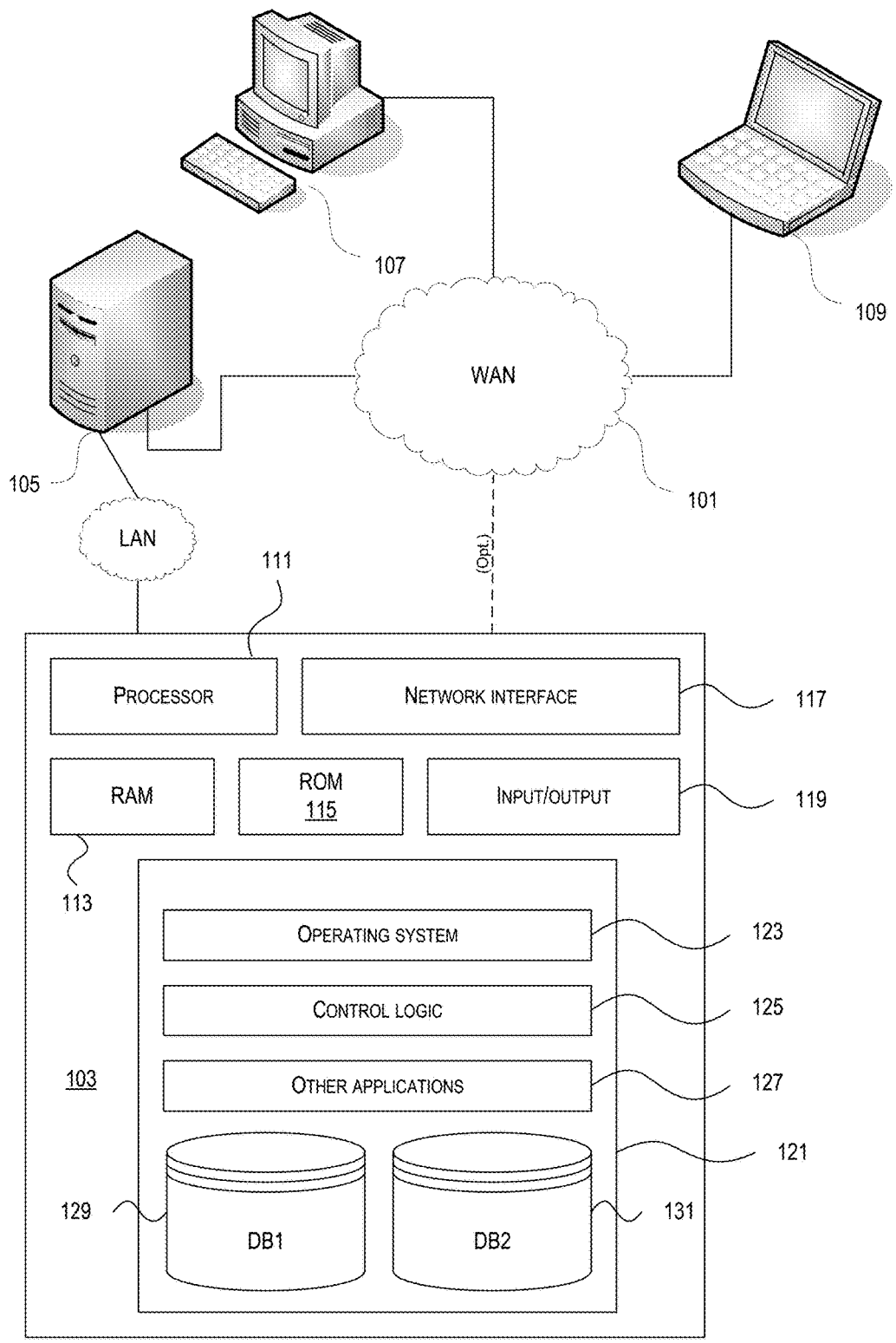
FIG. 1 illustrates a computer system architecture that may be used in accordance with one or more illustrative aspects described herein.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
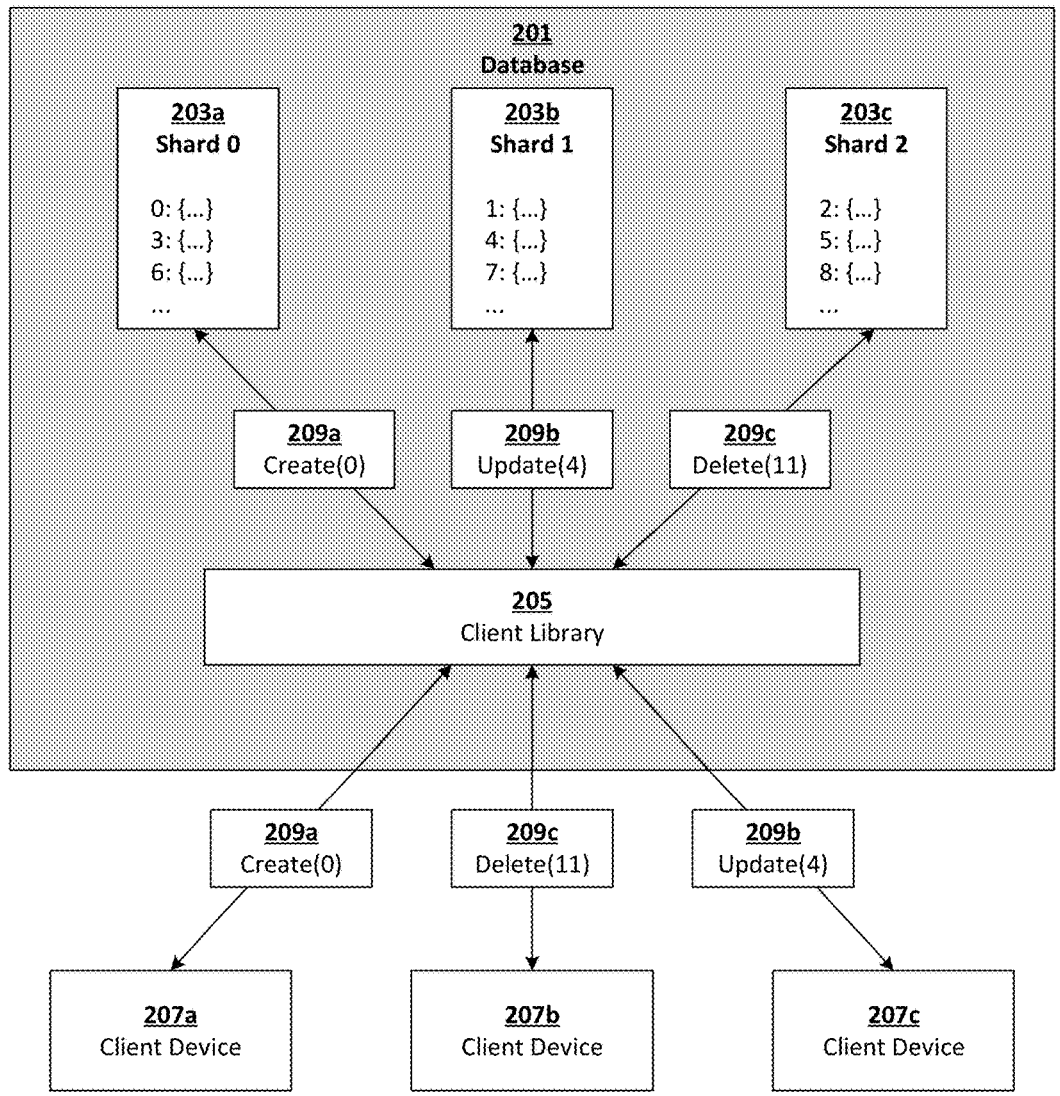
FIG. 2 illustrates a computing environment for routing FML operations through a client library to calculate the correct destination database shard.

In some embodiments, with further reference to FIG. 2, a database service 201 may be implemented as a distributed, in-memory key-value store. The keys may represent entity IDs and the values may represent entity states. These elements are described in greater detail below. The service may be sharded by entity ID, thus, if there are S shards total, entity n may be stored on shard n mod S. Other known sharding techniques may alternatively be used. In some embodiments, a client library 205 may calculate the shard that is responsible for operations 209a-c to a specified entity, each initiated by a client device 207a-c. In illustrative FIG. 2, the example database 201 has 3 shards 203a, 203b, 203c. In this example, request 209c, a request to delete an entity with ID 11, may be sent from client 207b to client library 205, wherein the client library calculates 11% 3=2 and subsequently sends request 209c to shard 2 203c.

Figure 3:
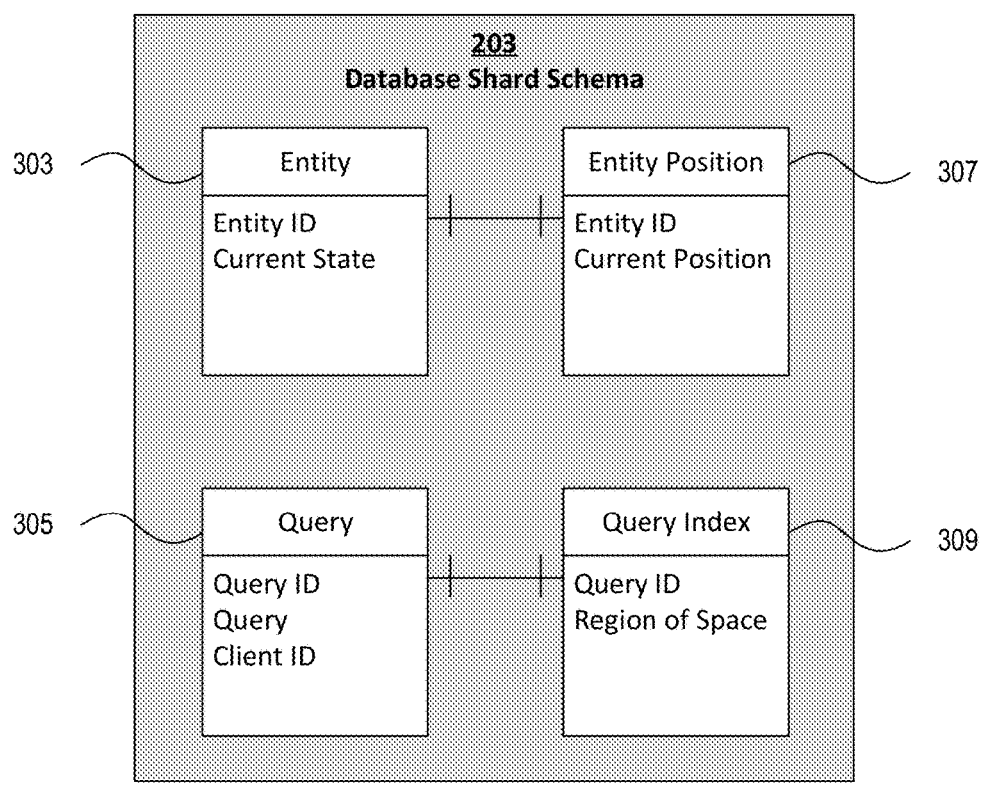
FIG. 3 illustrates a database schema that may be used in accordance with one or more illustrative aspects described herein.

Within database 201, each shard 203 may be single-threaded and responsible for all state data related to the entities for which it is authoritative. FIG. 3 illustrates a shard 203 within database 201 and a schema that may be used to track the current state of each entity within a simulated spatial environment. In entity-component-system architectures, such as those used in video game development, an entity in the database represents an object within the simulated environment, whose behavior and/or appearance may be affected by the actions of other objects, and/or whose actions may affect the behavior and/or appearance of other objects/entities. The state of an entity is defined by the state of its components. The state of an entity component is defined by the state of the component's properties. Each component defines the raw data for one aspect of the object, and how the object/entity interacts with the world. While entity state data is stored in the database, entity states are caused to be altered by systems that run on client workers outside the database. Each system usually runs continuously (e.g., each system may have its own private thread) and can perform global actions on every entity that possesses a component of the same aspect as that system. The schema may support at least three operations which may be used to mutate entities: create, update, and delete (articulated further below and for which illustrative pseudocode is shown in FIG. 7). The database may also support query, subscribe, and unsubscribe operations (articulated further below and for which illustrative pseudocode is shown in FIG. 8, all of which may be used to keep entity data current.

| | |
|---|---|
| create(initialState) | Create a new entity with the given initial state. Returns the ID of the newly created entity. |
| query(Query) | Execute a query and return the result. |
| update(entityId, componentUpdate) | Update the entity with the given ID by applying the component update to it. This operation will fail if no entity with the given ID exists in the database. Multiple components can be updated as long as they're on the same entity. |
| delete(entityId) | Delete the entity with the given ID. This operation will fail if the entity does not exist. |
| subscribe(Query) | Subscribe to a query. Updates to the result of the query will be streamed to the subscriber as they are applied to the database. Returns an ID identifying this subscription (subscriptionID). |
| unsubscribe(subscriptionId) | Unsubscribe from a streaming query. |

A query defines or represents a view on the database. Each query may include a constraint defining the matching entities, which result in zero or more entities that match the constraint, and a result type defining what data to return for the query. The result type may include a count of matching entities, the full state of matching entities, a partial state or subset of components of matching entities, or the like. For any entities matching the constraint, the database obtains or calculates the information for the specified result type, and prepares the data for return to the requesting client(s).

When a client requests or executes a query with the query operation, the systems returns a state of the view at a particular point in time, and the query may then be forgotten. When a client subscribes to a query, the client is telling the database service that it would like to know the current state of the view, and that the client would like to be kept up to date on the view's state as that state is changed by mutation operations (create, update, delete) performed on the database elsewhere. Thus, database 201 may be adapted to monitor and continuously updates clients that subscribe to ongoing queries, referred to as streaming queries, as further described herein.

Prior art databases are particularly inefficient when responding to streaming queries. That is, typical prior art systems receive a query, execute the query, return the query results to the source from which the query the originated, and then close or discard the query info. However, to respond to streaming queries, a database needs to determine, when an entity is mutated, which subscribed query or queries need to be informed about the mutation. The database described herein is specially adapted to more efficiently process streaming queries, thereby improving the performance of the computers on which it operates by allowing computers to execute with higher throughput, lower latency, and less processor time per query than prior solutions.

In some embodiments, entity data structure 303 (e.g., a table or other data structure) maintains the current state of each entity within the shard, along with its corresponding unique ID. In some embodiments, the entity data structure 303 is, and will be herein referred to as, an entity table.

Query data structure 305 may store the queries to which clients have subscribed, along with each query's corresponding unique ID and the subscribing client's unique ID. In some embodiments, query data structure 305 is, and may be herein referred to as, a query table. Queries provide state information for views, and views comprise one or more entities. Therefore, each query in the query table, when executed, may return state information about one or more entities in the entity table.

In some embodiments, for example an embodiment optimized for streaming spatial queries, query index data structure 309 is or may also include an R-tree. Query index data structure 309, however, may be indexed by any desired entity component, and thus may be used by database 201 to quickly determine which subscribed queries might need to be executed, and which entities might need to be updated (e.g., by providing updated entity/view information to one or more clients subscribed to that query), based on a mutation that affects that component. In some embodiments, the database may be implemented to efficiently handle spatial queries. To efficiently handle spatial queries, the query index data structure may map a region of space within the simulated spatial environment associated with a spatial query to the query's corresponding unique ID. For each spatial query stored in query table 305, the query's associated region of space may be stored in the query index data structure 309. In some embodiments, the region of space associated with a spatial query may be defined by a cylinder, sphere, rectangle, or other polyhedron or 3-dimensional boundary. Additionally, in an embodiment optimized for streaming spatial queries, query index data structure 309 may be indexed by location/region, and may thus be used by database 201 to quickly determine which subscribed queries might need to be executed, and which entities might need to be updated, based on a mutation that occurs in a particular location or region of the simulated environment.

In some embodiments, the database schema 203 may also include an entity position data structure 307 to further assist with spatial queries. In some embodiments, the entity position data structure 307 is or may include an R-tree (a type of data structure used for spatial access methods and for indexing multi-dimensional information such as geographical coordinates, polygons, polyhedrons, etc.), and maps each entity's position in the simulated 3D environment to the entity's corresponding unique ID. For each entity stored in the entity table 303 that possesses a position component, the entity's position is stored in the entity position data structure 307. The entity position data structure 307 is indexed by location, and may thus be used by database 201 to quickly determine which entities might be interested in a mutation that occurred in a particular location or region of the simulated environment.

Figure 4:
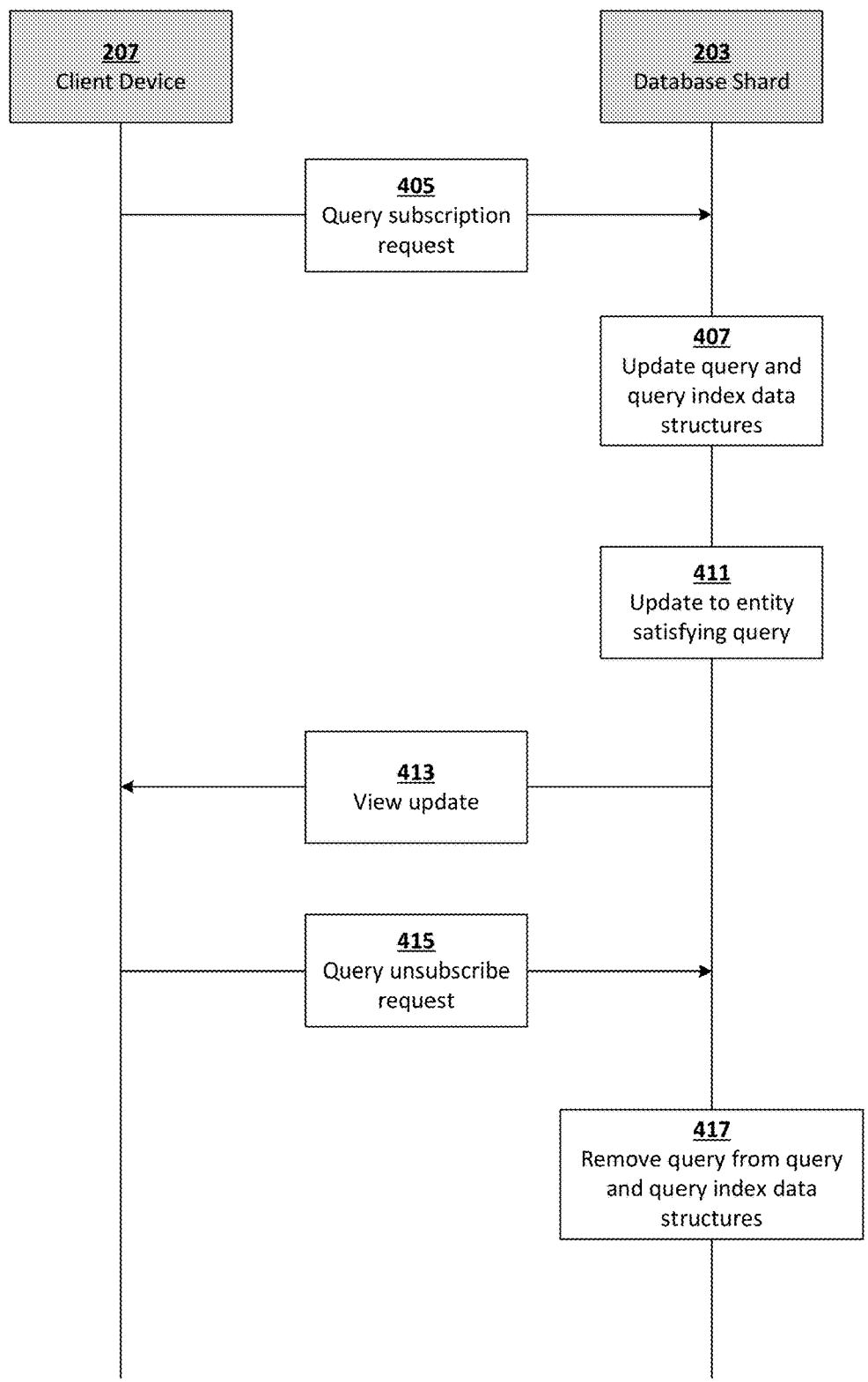
FIG. 4 illustrates an event sequence for a client to subscribe to a query and receive entity updates based on the query.

FIG. 4 illustrates an event flow that may occur when a client subscribes to a query. Client device 207 sends a subscription request 405 to a database shard 203, after which the database system in shard 203 adds, in step 407, the query to the query table 305 and query index data structure 309. By virtue of adding the query to the query table, the database and the requesting client are said to have a persistent connection regarding that query. For the duration of the connection, the system monitors mutations within the database at step 411 until the client device 207 unsubscribes from the query. When a mutation occurs anywhere within the database, the system determines which queries are affected or are likely to be affected based on the query index data structure 309. The system then executes the identified queries from query table 305. The system executes the associated query on database shard 203 and subsequently sends an update 413 to associated client device 207. Client device 207 may suspend or terminate its query subscription by sending a request to unsubscribe 415 to database shard 203. Upon receiving the request, the system removes the query from the query table 305 and the query index data structure 309.

In an embodiment where the database is implemented to handle the streaming of spatial queries, an entity position data structure 307 may be used to store the current position of each entity whereas the query index data structure 309 may map each query to a region of space. In such an embodiment, when a mutation occurs anywhere within the database, the system may identify the position of the mutated entity using the entity position data structure 307. For each region of space in the query index data structure 309 that encompasses the identified position, the system identifies the associated query/-ies and corresponding client(s) from query table 305.

Figure 5:
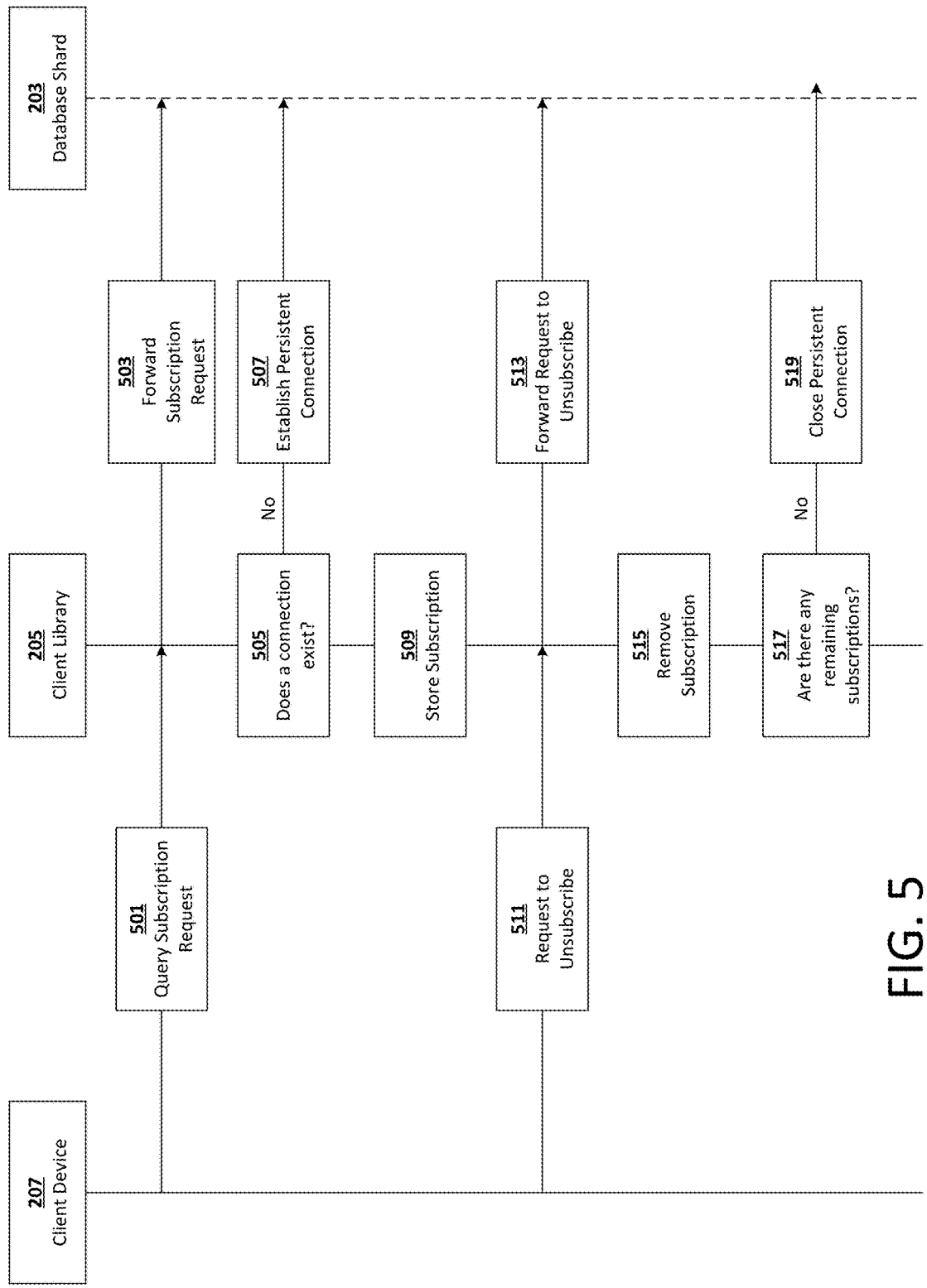
FIG. 5 illustrates an event sequence for the aggregation of query subscriptions and management of a persistent connection between the clients and database by the client library.

In some embodiments, client library 205 may operate as an intermediary between client device 207 and database shard 203, subscribing to a query on behalf of client device 207. FIG. 5 illustrates client library 205 coordinating query subscriptions from a plurality of client devices. Client device 207 sends query subscription request 501 to the client library 205. At step 503 client library 205 forwards the request to the appropriate database shard 203 so that the database can add the query to applicable tables and begin to monitor relevant mutations, as described above. Client library 205 then determines whether or not a persistent connection already exists between itself and the database at step 505. If no connection exists, the client library 205 establishes a persistent connection with database shard 203 at step 507. The client library 205 also stores the query subscription at step 509 and maintains the connection for as long as it is storing/managing at least one subscription. When client device 207 sends a request to unsubscribe from a query 511, client library 205 forwards the request to database shard 203 at step 513 so that the database can remove the query from applicable tables and stop monitoring relevant mutations, as described above. At step 515, client library 205 removes the subscription and checks for any remaining query subscriptions at step 517. If no subscriptions remain, there is no need for client library 205 to persist its connection with the database, thus, the connection is closed at step 519. This subscription aggregation greatly diminishes the number of re-connections and disconnections necessary between client devices and the database.

Figure 6:
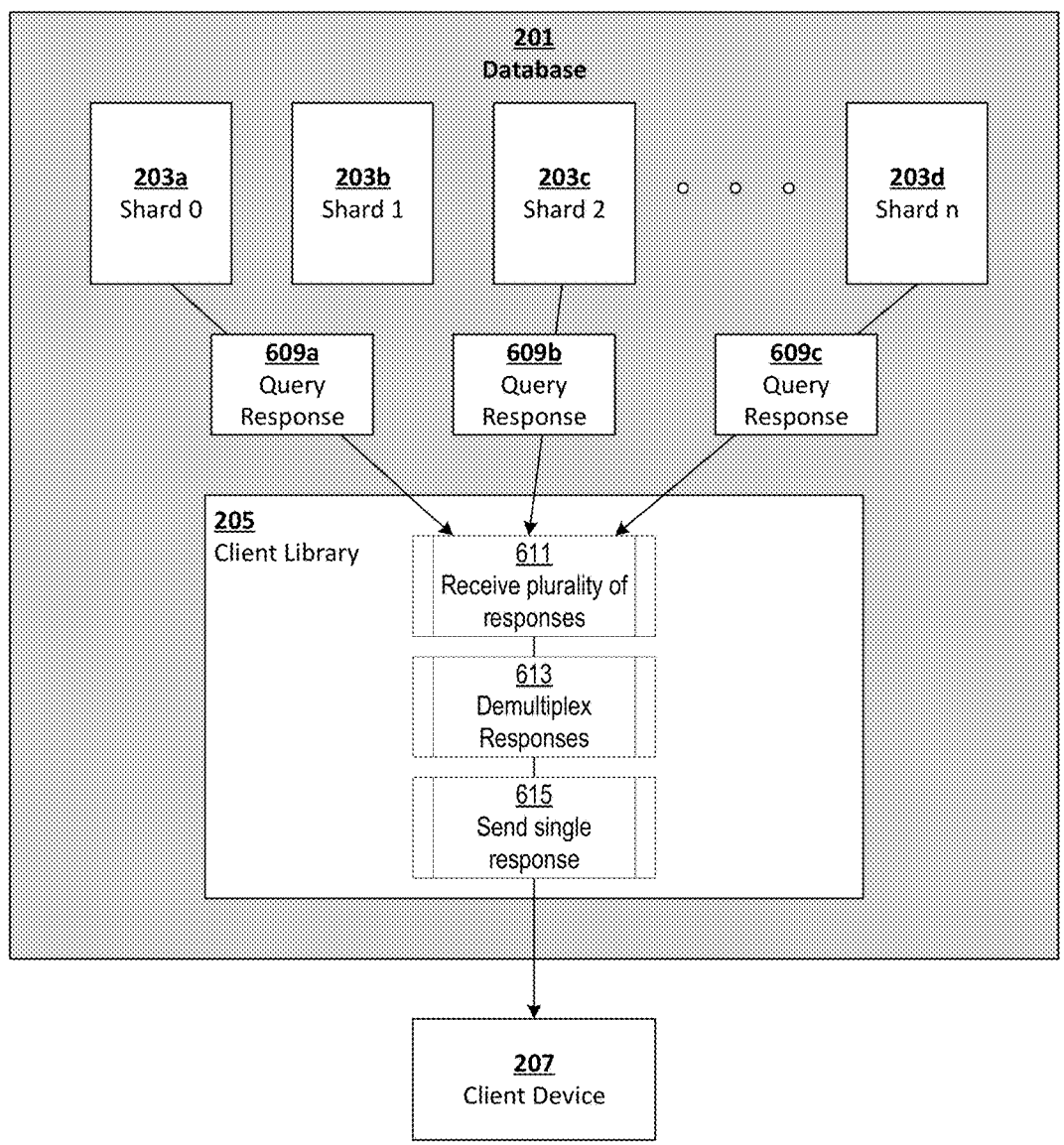
FIG. 6 illustrates a computing environment for a client device to demultiplex a plurality of update responses into a single response to send to a client.

In some embodiments, client library 205 may intercept responses that are sent from a plurality of shards 203a-d to a single client device 207 responsive to a one-time query, as is illustrated in FIG. 6. Once client library 205 receives query responses 609a-d at process 611, the client library 205 demultiplexes the responses to form a single response at process 613. Demultiplexing is a process in which multiple unrelated analog or digital signal streams are combined into one signal, so that they may be sent streamed over a single path or as a single discrete unit. The client library then sends at process 615 the single response to client device 207 to avoid unnecessary noise (extra messages) between the client and the database.

According to another aspect, and based on the above database architecture and schema, an optimized text-based query language may be used to generate and subscribe to database queries to obtain views on the state of a running simulation.

General query syntax may take the form:
select <result type> where <constraint>
Result types may include:

| Result type | Output |
| --- | --- |
| * | All the components of matching entities |
| Count (*) | Just the number of matching entities |
| Component1, Component2, . . . | Just the given components of matching entities |

A component may be named using <fully qualified component name>. A special keyword position can be used to refer to the component containing the entity's position, e.g., as illustrated below.

A special case may be used where the query initiator asks for no components at all, in which case the query just returns the IDs of matching entities. For example, the query "Select where true" will return the IDs of all the entities in the simulated environment.

Constraints define the criteria that an entity must match in order to satisfy the query. Constraints may include:

| Constraint | Matching entities |
| --- | --- |
| Position within sphere (x, y, z, r) | Within a sphere centred at (x, y, z) with the radius r |
| position within cylinder (x, z, r) | Within vertical cylinder where the cross section is a circle centred on (x, z) with the given radius |
| Position within box (x_lo, y_lo, z_lo, x_hi, y_hi, z_hi) | Within an axis aligned box with lower corner (x_lo, y_lo, z_lo) and upper corner (x_hi, y_hi, z_hi) |
| Position within rect (x_lo, z_lo, x_hi, z_hi) | Within a vertical rectangle where the cross section has corners (x_lo, z_lo) and (x_hi, z_hi) |
| id=<id> | The entity with the given ID |
| <constraint1> and <constraint2> | Those that match both constraint1 and constraint2 |
| <constraint1> or <constraint2> | Those that match either constraint1 or constraint2 |
| (<constraint>) | The same as constraint |
| Not constraint | Those that don't match constraint |
| true | Every entity |
| false | No entities |
| <field> <op> <value> | Entities with given component field matching the given value. The comparison operation <op> may be "=", "!=", ">", ">=" or "<=" with the expected meanings. |

According to one aspect, keywords may be case insensitive, so the queries "select * where id=7" and "SELECT * WhEre iD=7" are equivalent.

A query may include a particular field in an entity's state using the following syntax:

<fully qualified component name>/field/field/field

For example, to reference the property x of Position component:

Position/x

The query language may provide the capability to compare entity states to some values, e.g., using integer, double and/or string literals. Strings can be enclosed in single quotes (') or double quotes ("). To escape a quote character, you use two of the characters back to back. For example, the string "Joe's garage" could be written as: "Joe's garage" or 'Joe''s garage'. The string 'Don't call me "Shirley"' could be written as "Don't call me " "Shirley""" or 'Don''t call me "Shirley"'.

Using the above query language, clients can subscribe to queries, in which case the system will give the client the initial result of the query, and further keep the client up to date whenever the result changes. Results may be sent as a stream of messages representing result deltas, which describe the changes that have happened to the result of the query since the last message was sent. The first deltas describe the change compared to the empty result set.

Component value constraints may be implemented by looping over every entity and checking if the entity's components match the given constraints on their component values. This can be resource expensive if there are a lot of entities. However, if a component value constraint is used in a conjunction (e.g., with "and"), the more selective parts of the query may be executed first and then the component value constraints may be used to filter the entities that matched the other conjuncts.

For example, in a simulated environment with 1M entities, 100 of which are within 100 m of the origin, the following query may be very expensive because it has to loop over all 1M entities in the world:

Select * where Metadata/entity_type="island"

The following query, however, would be much cheaper because the system will first find the 100 entities matching the spatial part of the query, and then loop over those 100 entities to find those matching the component-value part:

Select * where Metadata/entity_type="island" and position within sphere(0, 0, 0, 100)

According to some aspects, there may also be query indices for other components to make streaming queries more efficient based on components other than location. For example, if streaming queries are performed based on strings, e.g., constraint=string, then a query index data structure may index queries based on string content rather than or in addition to location.

Regarding result types, it may be more efficient to ask for a count of matching entities than to get the snapshots of those matching entities. This is because less network traffic may be sent between database nodes and down to the client issuing the query. Similarly, it may be more efficient to ask for just the values of needed components than it is to ask for a full snapshot.

Regarding streaming queries, if a streaming query has a spatial component, the streaming query may be executed efficiently and the system can scale up to lots of simultaneous subscriptions (e.g., in a single threaded benchmark test with 1M spatial subscriptions and 1M entities, the present techniques allow at least 80,000 writes/s on one CPU core). A query is said to have a spatial component if its constraint is or includes a sphere, cylinder, box or rect constraint, e.g., if the constraint is a conjunction and one or more conjuncts are spatial.

For example, the following queries are "spatial" and can be streamed efficiently:

SELECT * where position within sphere(0, 0, 0, 100)
Select count(*) where Metadata/entity_type="island" and
    Size/height >100.0 and
Position within rect(1000, 1000, 2000, 2000)

However the following queries are not "spatial" and would be less efficient to subscribe to, unless there were a separate query index on height and/or type as applicable:

Select * where Size/height >100.0
Select count(*) where Metadata/entity_type="cow" and
    Colour/name="red"

The following are some examples to illustrate usage of the query language described herein. To get full snapshots of all the entities within 10 metres of the origin:

select * where position within sphere(0, 0, 0, 10)

To count the number of entities within a cylinder centered on the origin, with a radius of 0.5 meters:

Select count(*) where position within cylinder(0, 0, 0.5)

To get the position of entity 14:

Select position where id=14

To get the position and waypoints of all entities within 5 meters of the point (1, 2, 3):

Select position, Waypoints where position within sphere
    (1, 2, 3, 5)

To get the IDs of the entities in a spherical shell, centered on the origin, with width 50 meters and inner radius 100 m:

Select where position within sphere(0, 0, 0, 150) and (not
    position within sphere(0, 0, 0, 100))

To get the position of entities within 1 km of the origin with the entity type "BigThing":

Select position where position within sphere(0, 0, 0,
    1000) and Metadata/entity_type="BigThing"

To get the position and size of entities within 1 km of the origin that are taller than 10 m:
Select position, Size where position within sphere(0, 0, 0, 1000) and Size/height >=10.0

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, from a client, a request to subscribe to a query on a database storing a plurality of records, wherein each record has a plurality of data fields;
storing a client ID, the query, and a corresponding unique query ID as a new record in a query data structure storing a plurality of query records;
storing in a new record of a query index data structure the query ID and a second data field defining a location within a multidimensional space, wherein the query index data structure is indexed based on the second data field, wherein the second data field is related to one of the plurality of data fields, and wherein the query index data structure maps each query to a region of the multidimensional space;
establishing a persistent connection with the client; and
until the persistent connection is terminated:
determining, responsive to any update to one or more records, and based on the query index data structure, one or more queries of interest whose corresponding region of the multidimensional space encompasses at least one updated record; and
when the one or more queries of interest comprises the query, sending information to the client about each updated record satisfying the query.

2. The method of claim 1, wherein each record of the plurality of records defines an entity being simulated in a multidimensional spatial environment, and wherein each data field of the plurality of data fields represents a different component of that entity.

3. The method of claim 1, wherein the query index data structure comprises an R-tree.

4. The method of claim 1, wherein the computer readable instructions, when executed, further cause the device to configure a record position data structure to index each record based on its associated location within the multidimensional space, wherein the record position data structure indexes the current location of each record based on the unique entity ID of each record.

5. The method of claim 1, wherein the region of multidimensional space is defined by one of a sphere, cylinder, polyhedron, or rectangle.

6. The method of claim 1, wherein the database is sharded based on record ID.

7. One or more non-transitory computer readable storage media comprising computer readable instructions that, when executed, cause a device to perform:
receiving, from a client, a request to subscribe to a query on a database storing a plurality of records, wherein each record has a plurality of data fields;
storing a client ID, the query, and a corresponding unique query ID as a record in a query data structure;
storing in a new record of a query index data structure the query ID and a second data field defining a location within a multidimensional space, wherein the query index data structure is indexed based on the second data field, wherein the second data field is related to one of the plurality of data fields, and wherein the query index data structure maps each query to a region of the multidimensional space;
establishing a persistent connection with the client; and
until the persistent connection is terminated:
determining, responsive to any update to one or more records of the plurality of records in the database, and based on the query index data structure, one or more queries of interest whose corresponding region of the multidimensional space encompasses at least one updated record; and
when the one or more queries of interest comprises the query, sending information to the client about each updated record satisfying the query.

8. The computer readable storage media of claim 7, wherein the query data structure stores the client ID in a list, wherein each client ID stored in the list corresponds to a different client subscribed to the query.

9. The computer readable storage media of claim 7, wherein the location is multidimensional.

10. The computer readable storage media of claim 7, wherein each record of the plurality of records defines an entity being simulated in a multidimensional spatial environment, and wherein each data field of the plurality of data fields represents a different component of that entity.

11. The computer readable storage media of claim 7, wherein the query index data structure comprises an R-tree.

12. The computer readable storage media of claim 7, wherein the computer readable instructions, when executed, further cause the device to perform:
configuring a record position data structure to index each record based on its associated location within the multidimensional space, wherein the record position data structure indexes the current location of each record based on the unique record ID of each record; and
responsive to a record changing location, updating the record position data structure to reflect the current location of the record.

13. The computer readable storage media of claim 7, wherein the region of multidimensional space is defined by one of a sphere, cylinder, polyhedron, or rectangle.

14. The computer readable storage media of claim 7, wherein the database is sharded based on record ID.

15. A method comprising:
receiving, from a client, a request to subscribe to a query on a database storing a plurality of records, wherein each record represents an entity being simulated in a multidimensional spatial environment, and wherein each data field of a plurality of data fields within each record represents a different component of that entity, and wherein the plurality of data fields comprises a first data field storing a geographic location of the entity within the multidimensional spatial environment;
storing a client ID, the query, and a corresponding unique query ID in a record of a query data structure;
storing the query ID and a second data field in a record of a query index data structure indexed based on the second data field, wherein the second data field, for each query ID, defines an associated spatial region of interest within the multidimensional spatial environment;
establishing a persistent connection with the client; and until the persistent connection is terminated:
  determining, responsive to an update to one or more records of the plurality of records in the database, a list of one or more queries for which the update is within the associated region of interest;
  determining one or more clients subscribed to each query in the list of one or more queries; and
  sending, to each subscribed client, updated records within the associated region of interest for each query to which the client is subscribed.

* * * * *